United States Patent
Bailin

[11] 3,930,275
[45] Jan. 6, 1976

[54] METHOD OF FABRICATING A SLIPPER
[76] Inventor: Richard Bailin, 46 Johnson Ave., Englewood Cliffs, N.J. 07631
[22] Filed: Mar. 31, 1975
[21] Appl. No.: 563,999

[52] U.S. Cl. .............................................. 12/142 S
[51] Int. Cl.² .......................................... A43D 9/00
[58] Field of Search .................... 36/11.5; 12/142 S

[56] References Cited
UNITED STATES PATENTS

| 914,377 | 3/1909 | Baker | 12/142 S |
|---|---|---|---|
| 2,971,278 | 2/1961 | Scholl | 36/11.5 |
| 3,311,937 | 4/1967 | Conroy | 36/11.5 |

FOREIGN PATENTS OR APPLICATIONS

| 563,158 | 5/1957 | Italy | 12/142 S |

*Primary Examiner*—Patrick D. Lawson

[57] ABSTRACT

A novel slipper and its method of fabrication is described. The slipper comprises a substantially flat sole member with die-cut bounding edges onto which is heat-sealed an overlying arc-shaped vamp. The novel method is characterized by pre-tacking vamps at pre-determined locations to a sole web, and substantially simultaneously heat-sealing each vamp to a sole and die-cutting the bonded sole and vamp from the sole web.

9 Claims, 11 Drawing Figures

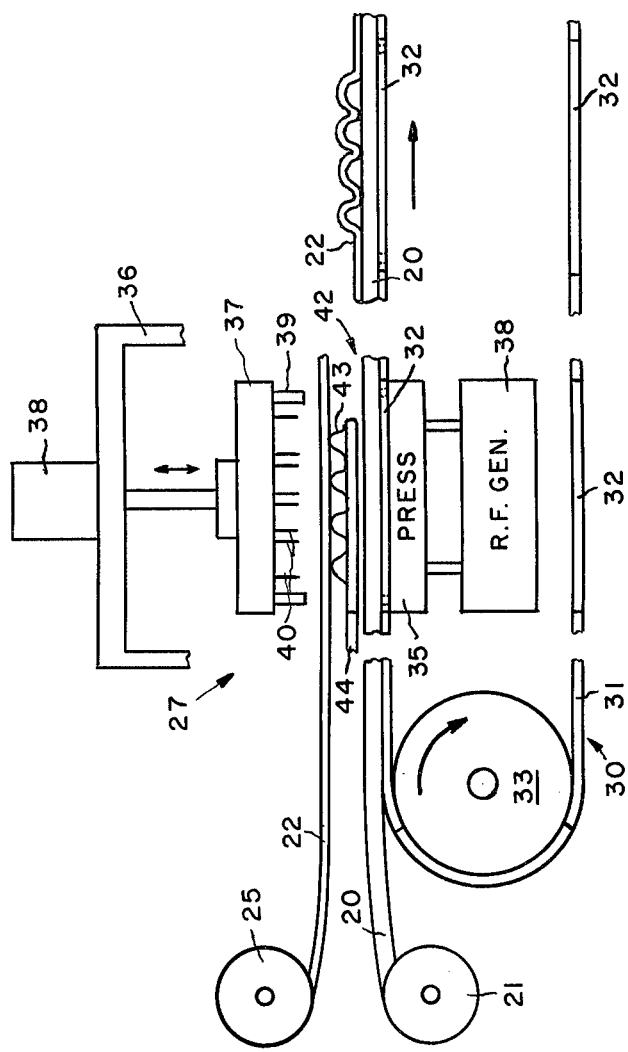
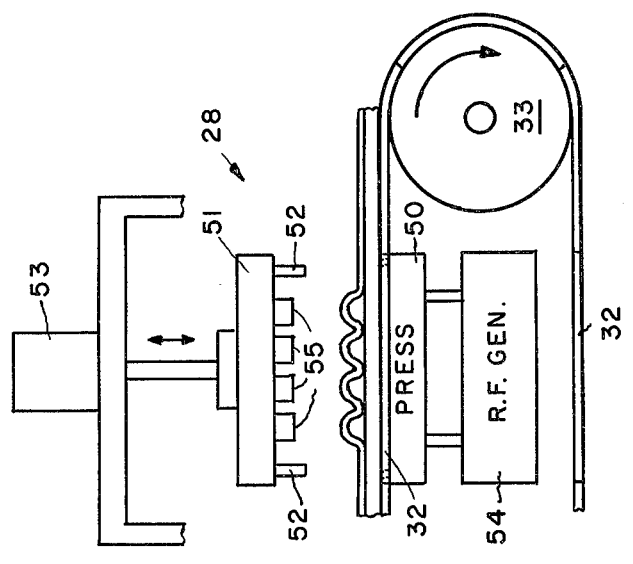
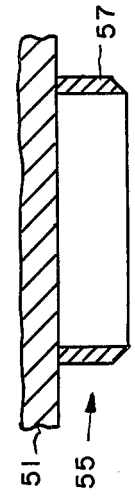
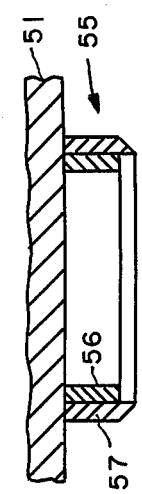
Fig. 2
Fig. 6a
Fig. 6b

METHOD OF FABRICATING A SLIPPER

This invention relates to novel slippers and their method of fabrication on a mass-production scale at extremely low cost.

Methods have been used in the past to manufacture slippers for household, bath or other uses out of plastic materials by electronic heat-sealing in order to reduce costs. For slippers constructed in the form of a relatively flat sole member provided with an overlying arc-shaped vamp or other curved strap-like structure by which the slipper is retained on the user's foot, it is accomplished by pre-cutting the soles from continuous sheets and then heat-sealing a pre-cut vamp to opposite edges of each precut sole. Separate handling and orientation of the pre-cut soles and pre-cut vamps increases considerably the production cost of each unit. In addition, such known process does not lend itself to the fabrication of slippers from non-electronically heat-sealable materials, such as rubber or fabric.

A main object of the invention is a slipper fabrication process which substantially reduces manufacturing costs.

Another important object of the invention is a low-cost fabrication process for slippers containing materials which cannot normally be electronically heat-sealed together.

Still a further object of the invention is an improved process for making a slipper having a substantially flat sole with die-cut bounding edges to which is electronically heat-sealed an overlying arc-shaped vamp with die-cut bounding edges, and the resulting slipper product.

The invention achieves the foregoing objects by a novel process characterized by the supply of the sole and possibly the vamp and other elements making up the slipper from continuous webs of flexible sheet material of sufficient lateral extent such that a number of soles and vamps as the case may be can be obtained. The continuous webs are introduced into apparatus for pre-attaching or pretacking the vamps or sections of the vamp web at predetermined locations of the sole web, following which the sole web with attached vamps is fed into electronic heat-sealing apparatus between electrodes which incorporate a die cutter configured to die-cut complete soles from the sole web while the pretacked vamps are substantially simultaneously die-cut and heat-sealed to each sole. The process of the invention thus allows the use of electrodes affording multiple dies thereby enabling the fabrication in one final sealing step of plural slippers with convex vamps from the continuous webs.

A feature of the process of the invention is construction of the die or electrode for each slipper into a complete annulus for die-cutting the completed slipper from the continuous webs. In a preferred embodiment, the closing pressure for the sealing die part is less than that applied during the cutting operation, which ensures proper sealing and die-cutting of the completed slipper.

These and further features and advantages of the invention as will be hereinafter described will be better understood from the following detailed description of several exemplary preferred embodiments of the invention, taken in conjunction with the accompanying drawings wherein:

FIGS. 1a, 1b and 1c are, respectively, a plan view, a cross-sectional view along the line 1b—1b, and a cross-sectional view along the line 1c—1c of one form of completed slipper made in accordance with this invention;

FIG. 2 is a schematic view of one form of apparatus for carrying out the process of this invention;

FIG. 6a is a cross-sectional view of one form of cutting and sealing die;

FIG. 6b is a cross-sectional view of another form of sealing and cutting die;

FIG. 7b is a plan view of the sole web with pretacked vamps after leaving the pretacking station of FIG. 7a.

When used in this description, the term "electronic heat-sealing" shall mean a dielectric material heating process resulting from the application of radio-frequency electromagnetic energy by way of mating electrodes to the material. Equipment for accomplishing this is well-known and commercially available. Unless mention of specific details is made, it is to be understood that conventional frequencies, powers, and electrode configurations can be used, as will be clear to those skilled in this art. The term "electronically heat-sealable material" when used herein shall mean those well known synthetic resin or plastic materials that have a sufficiently high loss factor that their temperature can be raised by electronic heat-sealing alone to a sealing or bonding temperature sufficient upon the application of conventional pressures to cause fusion-bonding of two such materials. Examples, as are well known, include thermoplastic materials such as polyvinylchloride (PVC), polyamide and the like. "Non-electronically heat-sealable" materials are those that cannot by electronic heat-sealing alone be bonded together, usually because their loss factor is not high enough or they don't melt. Examples are fabrics, rubber, paperboard, and plastics such as polyurethane foam.

Figure 1A:
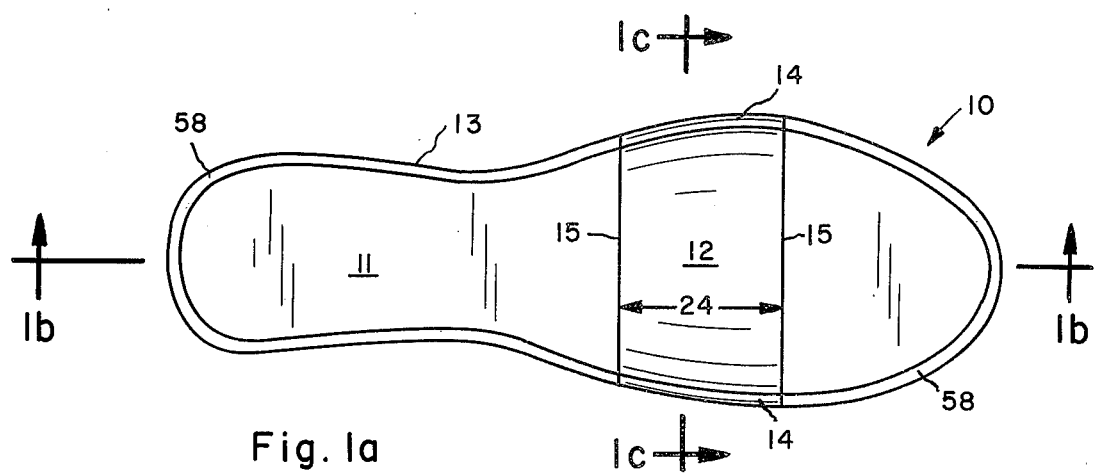
Figure 1B:
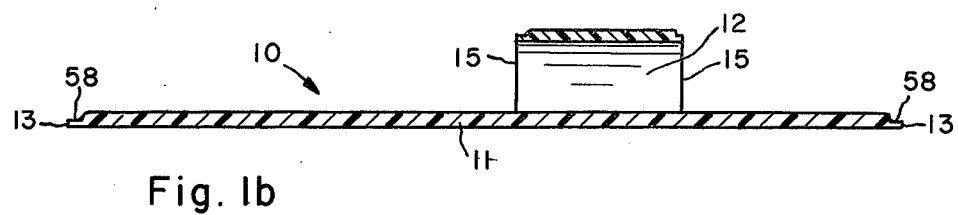
Figure 1C:
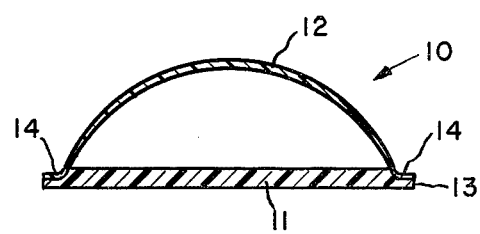

FIGS. 1a, 1b and 1c illustrate one form of slipper 10 in accordance with this invention. The slipper 10 comprises a sole 11 and a bowed or arched vamp 12. The sole 11 has a substantially flat form and has a boundary edge configuration generally corresponding to the shape of a human foot. The boundary edges 13 are die-cut, i.e., the sole has been cut cleanly through by a die along its entire boundary. The sole 11 may be constructed of a single layer of sheet material, or of multiple layers of sheet material, or may be of a laminated construction, examples of which will be given later. The curved or contoured vamp 12 is of a generally rectangular form which overlies the sole and is bonded to the sole at its periphery along opposite side edges 14 as shown. The bonded side edges 14 are die-cut similarly to that of the sole. The front and rear edges of the vamp are designated 15. The vamp 12 may also be constructed of a single layer of sheet material, or of multiple layers of sheet material, or may be of a laminated construction, examples of which will be given later.

FIG. 2 illustrates one form of manufacturing process in accordance with the invention for the simplest case of a sole and vamp each constituted of a single sheet of electronically heat-sealable material, such as PVC. The sole is supplied from a continuous web 20 of sheet material. The material which is quite thin, for example, 10–180 mils thick, is readily supplied from wide rolls 21, typically 24–54 inches wide, which are commercially available. For the embodiment illustrated in FIG. 2, the vamp material is supplied in the form of two narrow strips 22 each having a width equal to the front-to-rear length of the vamp indicated in FIG. 1 by the numeral 24. The supply rolls for the vamp webs 22 is shown at 25. As a first step in the process, the webs 20, 22 are pulled through a tacking press of conventional construction at a pretacking station shown schematically at 27.

The web feed mechanism must be constructed so that the slipper sections are maintained in preset positions so that a succession of operations at different stations can be performed on the slipper sections. This can be accomplished manually by providing locating marks or depressions in the webs at the first station, and using these marks for manually positioning the webs at succeeding stations in order to accurately locate the already operated on slipper sections for subsequent operations. For high speed production, this is best accomplished automatically. One form of apparatus suitable for this purpose is depicted in FIG. 2 and comprises a conveyor system 30 wherein a movable belt 31 is caused stepwise to index along a horizontal path between two work stations 27 and 28. The conveyor belt comprises a series of spaced, thin, flat, metal trays 32, for example, one-eighth inch thick aluminum, linked together to form a complete belt 31. The belt 31 is driven by suitable rollers 33 in an indexing manner so as to move the trays 32 stepwise through the station at an appropriate speed to enable each station operation to be carried out in full.

As will be observed, the sole and vamp webs 20, 22 are fed onto each tray 32 in succession as it passes underneath with the sole web 20 located under the vamp webs. The sole web is then manually pinned or otherwise temporarily affixed to the tray before or at the first station 27 in order to orient the sole web with respect to the tray. The tray 32 is indexed to the first station 27 where the vamps are pretacked to the sole web.

The apparatus at the first station 27 comprises a conventional C-frame low-pressure press, shown schematically, comprising a fixed lower-bed platen 35, a fixed C-frame 36 on which is vertically movable an upper die 37 by means of a conventional fluid cylinder 38'. A conventional radio-frequency generator 38 capable of performing electronic heat-sealing is housed within the press and is connected between the upper die 37 and lower platen 35, which are both of metal. The upper die plate is provided with suitable locating pins 39 which engage matching holes (not shown) in the lower platen 35 when the press closes. Mounted on the die plate are a series of spot-sealing electrodes in the form of pins 40 arranged in a suitable pattern for spot-sealing or tacking the vamp webs to the sole web at preselected areas. This requires that the vamp sections be first appropriately shaped into the arch shape they will assume in the finished slipper, which is accomplished by means of a conventional vamp-forming die or looping jig illustrated schematically at 42 in FIG. 2. This known device comprises a plurality of retractable arched molds 43 mounted on the press by a suitable mechanism 44 whereby the molds 43 can be located above each slipper section of the sole web 20. When the upper press die closes, the vamp strips are arch shaped over the dies 43 and in that shape the strips 22 are then spot-sealed or tacked down to the sole web 20. In this way, in accordance with the invention, the contoured vamps are accurately located and affixed to the sole webs at positions where they will be properly centered under the final sealing and cutting dies in a subsequent station to prevent the latter from contacting the vamps except at the desired sealing zones.

Figure 3:
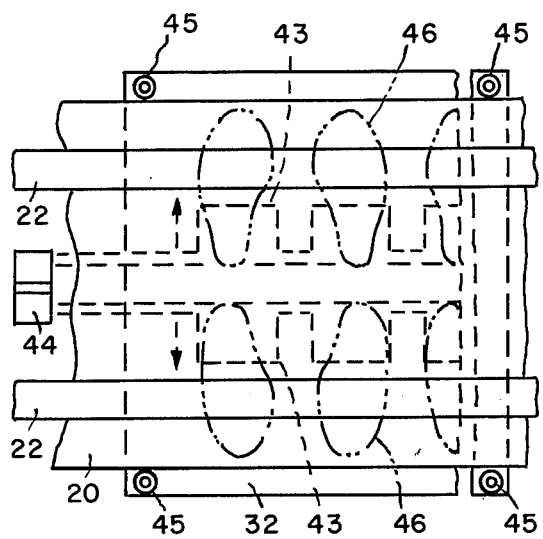
FIG. 3 is a schematic plan view of the sole and vamp webs while in the pretacking station illustrating how vamp webs can be pretacked to the sole web for a process wherein labor costs predominate over material costs.
Figure 4:
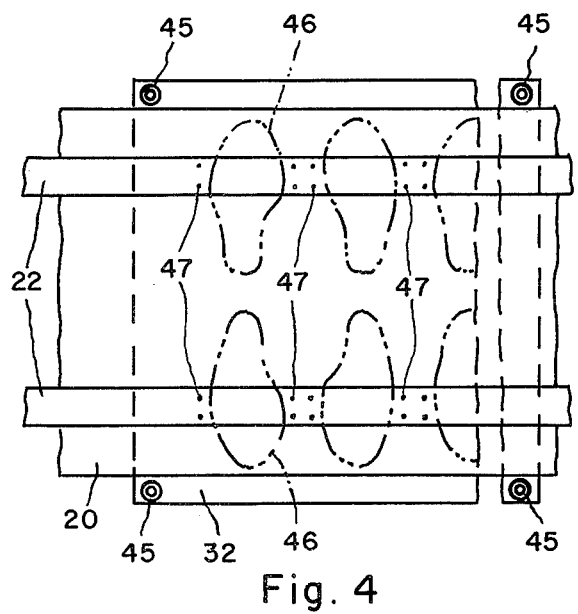
FIG. 4 is a schematic plan view of sole webs with pretacked vamp webs after leaving the pretacking station of FIG. 3.

The vamp-tacking operation is illustrated in FIGS. 3 and 4. FIG. 3 shows a conveyor tray 32 located on the press lower platen. The tray is provided with tapered or countersunk locating openings 45 at each corner which when the conveyor is indexed are located over the die pin holes in the lower platen, such that when the die 37 is lowered, the pins 39 engage and pass through the tray openings 45 and into the underlying aligned platen holes to locate the tray with pinned sole web 20 with respect to the spot-sealing electrodes 40. The ultimate slipper outlines to be formed are shown in dashed lines at 46. As will be observed, two rows of slippers 46 will be fashioned from the pinned section of the sole web. The slippers are arranged such that the broader areas, for the user's toe portion, are laterally aligned, and thus the vamp strips 22 are located in the proper position to form vamps on all the slipper sections. The vamp-forming dies 43 are shown in dashed outline. The actuating mechanism, for example, a known spring extender 44, is shown at the left. As the press closes, the vamp-forming dies are automatically moved laterally forward as shown by the arrows into positions under the vamp webs over each slipper section to be formed. In that position, the tacking die closes and the R.F. generator is activated causing a spot seal to be formed wherever the pin electrodes 40 are located alongside each vamp-forming die 43 tacking the curved vamp sections to the underlying sole web.

Figure 5:
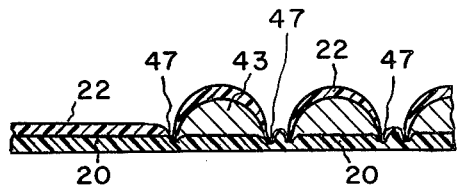
FIG. 5 is a cross-sectional view of the sole web with pretacked vamps after leaving the pretacking station of FIG. 3.

FIG. 4 illustrates the configuration as the tray indexes from the spot-sealing station to an intermediate position before entering the final sealing station. The spot seals are illustrated by dots 47 in FIG. 4. As will be noted, each vamp section is spot sealed to the web at two points at either side just outside of the slipper outline. More sealing spots or a different spot pattern can be employed if needed. FIG. 5 is a cross-section through the configuration along the vamp strip just after the spot-sealing operation of FIG. 3. The vamp-forming dies 43 cause the vamp strips to assume their final bowed shape before spot-sealing. When the press opens causing the vamp-forming dies to retract, which is conventionally accomplished by an air cylinder return, the stiffness of the vamp material causes the tacked vamps to retain their bowed position during subsequent processing. In this form, as illustrated at the center of FIG. 2, still pinned to the tray 32, the assembly enters a seal and cutting press designated 28.

The seal and cutting press 28 is again of conventional construction similar to the press 27 but of the high-pressure type, having a lower platen 50 with locator holes in the corners, an upper die plate 51 with locator pins 52, a hydraulic cylinder 53 for moving the die up and down, and an R.F. generator 54. On the upper die plate 51 are mounted multiple sealing and cutting dies 55. One form of suitable die is illustrated in cross-section in FIG. 6a, and comprises a fixed inner sealing annulus 56 in the shape of the final slipper and a fixed surrounding outer cutter annulus 57. Both can be conveniently formed of any well-conducting metal, though the cutter should be a hard metal such as steel for long life. The inner sealing die 56 has a flat bottom, below which protrudes the knife edge of the cutter 57. The shape of the sealing die 56 conforms to the seal outline designated 58 in FIGS. 1a and 1b. When the press closes, the hollow die sections 56 close down on the vamps pretacked to the sole web. The trays 32 are located on platen 50 by the same locator holes 45 used during the tacking operation to ensure proper location of the dies 55 with respect to the pre-tacked vamps. The sealing die 56 closes on the vamp inside of the spot seals 47, with only moderate pressure applied. The pressure is sufficient to compress the vamp and sole webs, but is insufficient to cause the cutter 57 to cut through the material. Then the R.F. generator is activated causing heat sealing of the compressed edges at the sealing zones 14 (FIG. 1), and permanent deformation along the entire boundary of the slipper outline indicated at 58 (FIG. 1). Substantially simultaneously, or immediately afterwards, the die pressure is increased to the level at which the cutter 57 cuts cleanly through the web materials at the deformed boundary die-cutting the completed slipper from the webs. The completed slippers can be removed as the tray indexes to the right of FIG. 2 out of the final sealing station.

With the die configuration of FIG. 6a, a deformed zone 58 is formed completely around the slipper edge or border. By appropriate shaping of the sealing edge, a stitch-type appearance can be embossed onto the deformed edge for ornamental purposes. If no border edge is desired, the electrode configuration of FIG. 6b can be employed essentially comprising just the knife edge 57 alone serving also as the sealer. In this case, the seal is formed by the knife edge when the moderate die pressure is applied, and then when the pressure is raised to the higher level the same knife edge cuts through the sealed region to sever the completed slipper from the webs effectively eliminating the border. Spring-loaded electrodes are also suitable.

FIGS. 3 and 4 illustrated the process of the invention for the case wherein labor costs predominate over material costs, and thus the slipper outlines can be oriented on the sole web such that the vamp sections are in-line thereby enabling the use of vamp strips. However, the slipper outlines, with the broader parts aligned, does not maximize slipper yield per square unit of the sole web. In order to minimize scrap, the slipper outlines should be oriented so that each slipper toe portion adjoins an adjacent slipper heel portion, in which case the vamps are no longer in-line, and a modified process is necessary for tacking the vamps in position. This is illustrated in FIGS. 7a and 7b.

Figure 7A:
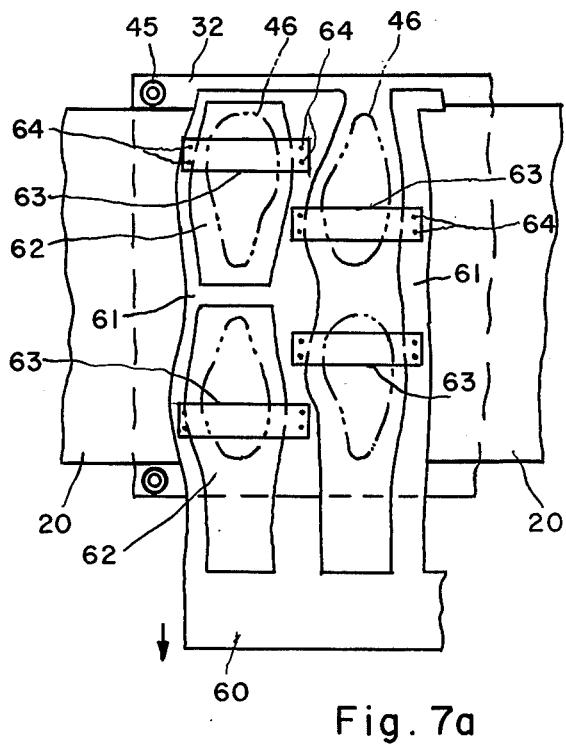
FIG. 7a is a schematic plan view similar to FIG. 3 for a process wherein material costs predominate over labor costs.
Figure 7B:
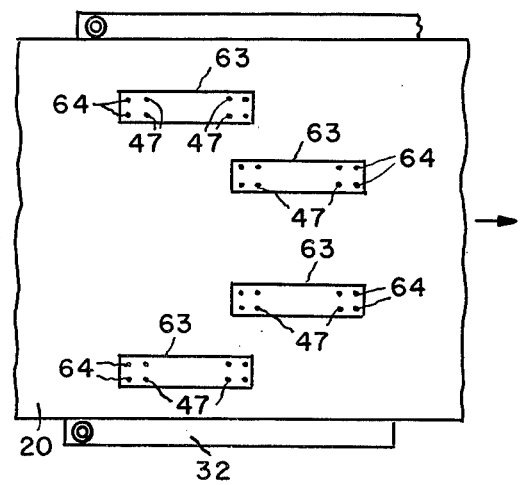

FIG. 7a illustrates the vamp tacking process at the first station. The sole web, as before, is designated 20, and is shown on a tray 32 at the tacking station. The slipper outlines are shown at 46 in phantom. Note in comparison with FIG. 3 that alternate columns are reversed for closer nesting of the slippers to reduce scrap. As a result, the vamps are no longer aligned, and vamp strips cannot be used. It thus becomes necessary to use precut vamp straps which will involve more individual handling and increased labor costs, but will save material. The vamp strips may be precut on any standard die-cutting machine so as to have the desired vamp width (dimension 24 in FIG. 1a), but an overall length that exceeds the length the vamp will have in the finished slipper, leaving excess vamp portions at opposite ends by which the vamp section can be supported for tacking to the sole web. The vamp sections are suitably located with respect to the slipper by use of known shuttle type locators, one form of which is illustrated in FIG. 7a. This comprises a frame 60 suspended from the side of the press so as to be laterally movable between the die sections when open. The frame 60 includes extended finger sections 61 which are configured to fit between the slipper outlines 46 of the finished slippers, and have openings or cut-outs 62 at the positions where the vamps are to be tacked to the sole web. The precut vamp sections, indicated by 63, are manually suspended on the fingered extensions 61 so as to bridge the cut-outs 62 as shown. Suspension may be readily accomplished by pinning of the vamp sections as shown at 64, or by the use of springs or any other appropriate holders. Where pinning is used, the pin holes can be placed in the vamp sections when they are precut from larger webs. Now, when the tacking press closes, each of the vamp sections 63 can be tacked to the underlying sole web 20 by the spot-sealing electrodes 40 illustrated in FIG. 2 passing through the frame openings 62 in the space between the frame inner edge and the slipper outline. After the tacking operation, the vamp sections are unpinned from the frame, and the sole web 20 with tacked vamps 63 on the tray 32 indexed to the next position, illustrated in FIG. 7b. FIG. 7b shows the vamps 63 tacked to the sole web 20 at spots 47. When the indexed tray enters the final sealing station, the tacked vamps will be properly located with respect to the cutting and sealing dies which are now oriented according to the pattern 46 illustrated in FIG. 7a. An advantage of this modified process is that the vamps need not be simple rectangles as they would be when formed from strips, but could be given more complicated, more asymmetrical, or more ornamental configurations. Moreover, during the precutting operation, the edges can also be pre-sealed if desired, or the surface embossed to enhance its appearance. In addition, polyester goring or other embroidery can be added to the vamp to enhance its appearance before or during tacking to the sole web.

In the examples so far described, both the sole and vamp were each constructed of a single sheet of electronically heat-sealable material, such as of PVC. In place of the thin flexible PVC sheet can be substituted so-called PVC semi-rigid foam as a sole material, which is also electronically heat-sealable but thicker and less flexible than the PVC sheet.

The process of the invention also lends itself to the manufacture of slippers which are more attractive or durable or comfortable at little additional labor expense. For instance, the sole can be constituted of plural layers of electronically heat-sealable material. For instance, a two layer construction can be constituted of a PVC foam or sheet bottom layer and a top layer or sock lining of a differently colored PVC sheet. A preferred three layer construction includes a cushion layer in the sole between the bottom and top sole layers. Examples of electronically heat-sealable cushion layers include PVC foam, polyurethane vinyl-impregnated foam, reticulated polyether vinyl impregnated foam, PVC fiberbond, and wadding with PVC binder.

Similarly to the process used for the single layer sole, all sole layers are preferably supplied from rolls as continuous webs fed in the proper order onto the conveyor tray on the lower press platen of the sealing apparatus. All of the webs are then temporarily affixed to the tray and processed jointly in the same manner as the single web 20 of FIGS. 2 and 7. While supply of continuous webs offers the least labor expense, in some cases intermediate sole layers can be pre-cut to size and manually located in the presses over each sole to be made. An example of such use is the provision of cardboard sole stiffeners to be located between the sole top and bottom sheets to increase the rigidity of the sole. The cardboard lies inside of the border seam and remains unbonded in the completed article.

The invention is not limited to three-layer sole constructions, but four or five layer sole constructions are also possible. A particularly attractive sole configuration is a PVC bottom layer, a PVC foam cushion, a PVC striated colored sheet, and a translucent PVC top layer.

The vamp can also be made up of one or more layers of electronically heat-sealable material, supplied from rolls as continuous webs as in the process depicted in FIG. 2, or pre-die-cut in unison in the same manner as described in connection with the modified process depicted in FIG. 7.

In accordance with a further feature of the invention, non-electronically heat-sealable materials can also be used in the slipper in accordance with this invention. Examples are sponge rubber for the sole bottom layer and fabric for the sock lining of the sole. When such non-electronically heat-sealable materials are present, then some means must be provided to enable them to be sealed to the other sole layers and to the vamp. For this purpose, it is preferred to provide an intermediate layer of heat-activated adhesive that when activated will bond to the non-electronically heat-sealable materials or other materials present. It is preferred to use for this purpose a thin polyamide fiber net, available commercially as "Pellon," which melts when subjected to electronic heat-sealing. The Pellon is available in the form of rolls as a continuous web and can be processed in the same manner as the other webs used in the sole and vamp. Thus, when the top sole layer is fabric, and a PVC foam is used as the cushion layer, then a film of Pellon would be provided between the fabric sock liner and the cushion, bonding the latter layers together along the border sealing zone during the final heat-sealing step. To seal the vamp to the sole sock lining when of fabric, an additional layer of Pellon is provided between the vamp side edges and the sole sock lining at the border sealing zone. It is preferred to provide the Pellon strip to the vamp before the latter is spot-sealed to the web.

The heat-activated adhesive layer can be omitted between the fabric and cushion layer by precoating or laminating the sock liner on the side facing the cushion with PVC. Then, the PVC coating or lamination will bond to the cushion during the final sealing step, requiring the adhesive layer only between the vamp and the fabric top layer of the sole.

Additional ornamentation or styling can be provided for the vamp by pre-stitching or pre-sealing to the vamp across its top a decorative material, such as embroidered elastic or polyester goring. Ornamentation can also be provided by embossing of the vamp before sealing to the sole.

The weld of the vamp to the soles can be reinforced by means of a gusset or enlargement of the fused area at the vamp corners, or if desired by manually adding adhesive by means of a spot glue applicator to the locations under the tacked vamps where the corners will become located during the subsequent final sealing operation.

While electronic heat-sealing is preferred when using at least one electronically heat-sealable material, the process of the invention is also applicable to slippers formed entirely of materials that cannot be electronically heat-sealed, but require the use of known hot die sealing methods. Examples of such materials include polyurethane foam. Such materials would be processed in the same manner as described above, except that sealing would be effected by means of a hot die instead of by R.F. energy.

As will be evident from the foregoing description, the process of the invention enables the mass-production from continuous webs of flat-soled slippers having an arc-shaped, foot-retaining vamp in a remarkably small number of steps requiring minimum handling by low-skilled personnel and thus at remarkably low cost. The process is applicable not only to electronically heat-sealable materials, but also through the use of a fusible bonding sheet or hot die sealing or other techniques as described to more elaborate or more attractive slipper constructions employing non-electronically heat-sealable materials. The resulting slippers are durable, attractive, and can be made of such low cost as to be disposable if desired. The die-cut edges offer improved results over tear seals, in that no raggedness results, and no extra labor is needed to remove the scrap.

In the embodiments illustrated, the individual vamp sections or strips were attached to the sole web after properly locating same by spot welding or sealing. While this is the preferred method, any suitable means can be utilized for temporarily attaching the pre-located vamp sections to the sole web so that they are properly centered under the sealing and cutting dies at the sealing and cutting station. For instance, instead of spot-sealing, the vamp sections can be pinned to the sole web at the same places indicated by reference numeral 47 in FIGS. 4 and 7b. For this purpose, it would be preferred to use a wire tray for supporting the sole web for receiving the temporary pin attachments.

While my invention has been described in connection with specific embodiments thereof, those skilled in the art will recognize that various modifications are possible within the principles enunciated herein and thus the present invention is not to be limited to the specific embodiments disclosed.

What is claimed is:

1. A method of manufacturing slippers each having a flat sole member and an arc-shaped vamp disposed over the sole member to retain the slipper on the foot of a user, comprising the steps:
    a. providing a continuous sole web of sufficient lateral extent to enable plural sole members to be made therefrom,
    b. locating plural vamp sections over the sole web at predetermined locations,
    c. attaching the plural vamps in their final arc-shape to the sole web at the predetermined locations,
    d. positioning the sole web with preattached vamps under a sealing and cutting die, and
    e. heat-sealing the preattached vamps at opposite sealing zones to the sole web by the sealing die and substantially simultaneously die-cutting entire slippers with heat-sealed vamps from the sole web.

2. The method of claim 1 wherein the heat-sealing of step (e) is carried out with moderate die pressure, and the die-cutting is carried out with increased die pressure.

3. The method of claim 1 wherein the sole web is composed of plural material layers.

4. The method of claim 1 wherein the vamp is supplied in the form of a continuous strip, and adjacent sections of the vamp strip are tacked to the sole web while a curved vamp-forming die is temporarily positioned between the vamp strip and sole web at the predetermined locations.

5. The method of claim 1 wherein plural vamp sections are pre-formed before the attaching step, and temporarily suspended over the predetermined locations of the sole web before the attaching step is executed.

6. The method of claim 1 wherein the attaching and sealing-cutting steps are carried out at preceding and subsequent stations, and the sole web is conveyed between the stations while temporarily affixed to a locating tray provided with means for locating same with respect to the attaching and sealing-cutting dies.

7. The method of claim 1 wherein the attaching step is executed by means of a spot-sealing die having pin sealers.

8. The method of claim 1 wherein the sealing-cutting die forms a continuous annulus.

9. The method of claim 1 wherein the sole and vamp comprise electronically heat-sealable materials.

* * * * *